United States Patent
Karpinskyy et al.

(10) Patent No.: US 10,439,613 B2
(45) Date of Patent: Oct. 8, 2019

(54) INTEGRATED CIRCUIT FOR PHYSICALLY UNCLONABLE FUNCTION AND DEVICE INCLUDING THE SAME

(71) Applicant: SAMSUNG ELECTRONICS CO., LTD., Suwon-si, Gyeonggi-do (KR)

(72) Inventors: Bohdan Karpinskyy, Suwon-si (KR); Dae-hyeon Kim, Suwon-si (KR); Mi-jung Noh, Yongin-si (KR); Sang-wook Park, Hwaseong-si (KR); Yong-ki Lee, Yongin-si (KR); Yun-hyeok Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/004,517

(22) Filed: Jun. 11, 2018

(65) Prior Publication Data

US 2019/0068190 A1  Feb. 28, 2019

(30) Foreign Application Priority Data

Aug. 30, 2017  (KR) .................. 10-2017-0110350

(51) Int. Cl.
*H03K 19/00* (2006.01)
*H04L 9/08* (2006.01)
(Continued)

(52) U.S. Cl.
CPC ......... *H03K 19/003* (2013.01); *H01L 23/576* (2013.01); *H04L 9/0866* (2013.01);
(Continued)

(58) Field of Classification Search
None
See application file for complete search history.

(56) References Cited

U.S. PATENT DOCUMENTS

| 8,443,022 B2 | 5/2013 | Vasyltsov et al. |
| 8,619,979 B2 | 12/2013 | Ficke et al. |
| (Continued) | | |

FOREIGN PATENT DOCUMENTS

| KR | 10-2014-0014538 A | 2/2014 |
| WO | WO 2010/123185 A1 | 10/2010 |

OTHER PUBLICATIONS

Suh, et al., Physical Unclonable Functions for Device Authentication and Secret Key Generation,. Design Automation Conference, Jun. 4-8, 2007. DAC '07. 44$^{th}$ ACM/IEEE, San Diego,Ca.

*Primary Examiner* — Jany Richardson
(74) *Attorney, Agent, or Firm* — Lee & Morse, P.C.

(57) ABSTRACT

An integrated circuit for a physically unclonable function (PUF) includes first and second PUF cells and a combination circuit. The first and second PUF cells respectively output first and second cell signals having unique levels based on a threshold level of a logic gate. The combination circuit includes a first stage that generates a first combination signal based on the first and second cell signals. The first and second PUF cells respectively include first and second logic gates to respectively output the first and second cell signals. The combination circuit includes a third logic gate that receives the first and second cell signals and outputs the first combination signal. The third logic gate has a same structure as each of the first and second logic gates.

18 Claims, 14 Drawing Sheets

(51) Int. Cl.
  *G06F 7/58* (2006.01)
  *H03K 19/003* (2006.01)
  *H01L 23/00* (2006.01)
  *H04L 9/32* (2006.01)

(52) U.S. Cl.
  CPC ............ *H04L 9/0869* (2013.01); *G06F 7/588* (2013.01); *H04L 9/3278* (2013.01)

(56) References Cited

U.S. PATENT DOCUMENTS

| | | |
|---|---|---|
| 8,848,477 B2 | 9/2014 | Schrijen et al. |
| 9,018,972 B1 | 4/2015 | Gurrieri et al. |
| 9,032,476 B2 | 5/2015 | Potkonjak |
| 9,202,554 B2 | 12/2015 | Chu et al. |
| 9,337,837 B2 | 5/2016 | Pfeiffer et al. |
| 9,350,330 B2 | 5/2016 | Simons et al. |
| 9,350,354 B2 | 5/2016 | Wang et al. |
| 9,405,510 B2 | 8/2016 | Karpinskyy et al. |
| 9,489,999 B2 | 11/2016 | Rosenberg et al. |
| 9,584,329 B1 | 2/2017 | Trimberger |
| 9,590,626 B1 | 3/2017 | Pedersen |
| 2006/0069706 A1* | 3/2006 | Lazich .................... G06F 7/588 708/251 |
| 2007/0143384 A1* | 6/2007 | Muranaka ............... G06F 7/588 708/250 |
| 2010/0322418 A1* | 12/2010 | Potkonjak ............. H04L 9/0866 380/255 |
| 2014/0201851 A1* | 7/2014 | Guo ...................... H04L 9/0866 726/34 |
| 2015/0058928 A1 | 2/2015 | Guo et al. |
| 2015/0067895 A1 | 3/2015 | Vasyltsov et al. |
| 2015/0207627 A1 | 7/2015 | Yamamoto et al. |
| 2016/0034694 A1 | 2/2016 | Rajendran et al. |
| 2017/0092601 A1 | 3/2017 | Okagaki |
| 2017/0132434 A1 | 5/2017 | Wang et al. |

\* cited by examiner

INTEGRATED CIRCUIT FOR PHYSICALLY UNCLONABLE FUNCTION AND DEVICE INCLUDING THE SAME

CROSS-REFERENCE TO RELATED APPLICATION

Korean Patent Application No. 10-2017-0110350, filed on Aug. 30, 2017, and entitled, "Integrated Circuit for Physically Unclonable Function and Device Including the Same," is incorporated by reference herein in its entirety.

BACKGROUND

1. Field

One or more embodiments described herein relate to an integrated circuit for a physically unclonable function and a device including such an integrated circuit.

2. Description of the Related Art

A physically unclonable function may provide a unique value corresponding to hardware based on intrinsic characteristics of the hardware. For example, a plurality of pieces of hardware (e.g., chips) may be manufactured by the same process. However, the pieces of hardware may not be physically completely identical because of slight variations therein. Due to such slight variations, a unique value of the hardware may be extracted and used in applications requiring security, such as secure communication systems, security data processes, user identification, and the like. Accordingly, components that provide a physically unclonable function may be used in various applications and may have an efficient structure with high entropy or low predictability.

SUMMARY

In accordance with one or more embodiments, an integrated circuit for a physically unclonable function (PUF) includes first and second PUF cells to respectively output first and second cell signals having unique levels based on a threshold level of a logic gate; and a combination circuit including a first stage to generate a first combination signal based on the first and second cell signals, wherein the first and second PUF cells respectively include first and second logic gates to respectively output the first and second cell signals, wherein the combination circuit includes a third logic gate to receive the first and second cell signals and output the first combination signal, and the third logic gate has a same structure as each of the first and second logic gates.

In accordance with one or more other embodiments, an integrated circuit having a physically unclonable function (PUF) includes a plurality of PUF cells, each of which is to generate a cell signal having a unique level; and a combination circuit to receive a plurality of cell signals from the plurality of PUF cells and generate an output signal corresponding to at least one of the plurality of cell signals, wherein each of the plurality of PUF cells includes a plurality of logic gates and wherein the unique level of the cell signal is determined based on threshold levels of the plurality of logic gates.

In accordance with one or more other embodiments, an integrated circuit for a physically unclonable function (PUF) includes a logic block including a plurality of PUF cells to respectively generate cell signals having unique levels determined based on threshold levels of a plurality of logic gates, the logic block to output an output signal corresponding to at least one of a plurality of cell signals based on a plurality of enable signals; and a controller to generate the plurality of enable signals including an activated enable signal to select at least one of the plurality of PUF cells and to generate a key of the integrated circuit based on the output signal.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
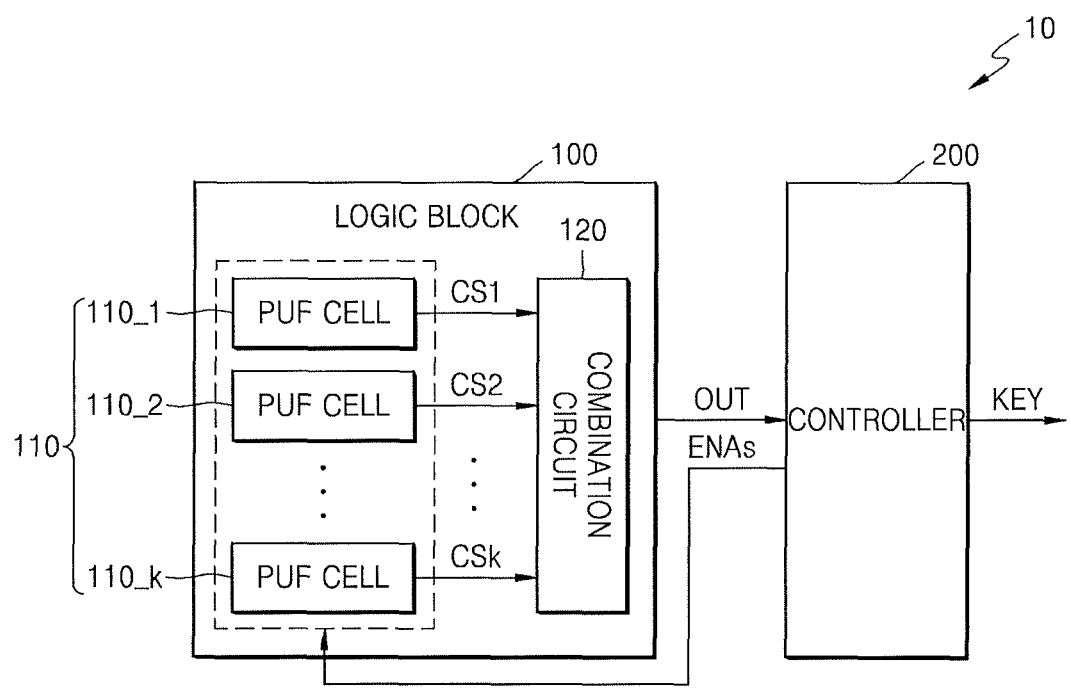
FIG. 1 illustrates an embodiment of an integrated circuit (IC) for a physically unclonable function (PUF)

FIG. 1 illustrates an embodiment of an integrated circuit (IC) 10 for a physically unclonable function (PUF). The IC 10 may generate a key KEY as a unique value of the IC 10 and may include a logic block 100 and a controller 200. In some embodiments, the IC 10 may be manufactured by a semiconductor process, and the logic block 100 and the controller 200 may be embodied in one package or respectively embodied in different packages.

Referring to FIG. 1, the logic block 100 may receive enable signals ENAs from the controller 200 and provide an output signal OUT to the controller 200. The logic block 100 may be designed, for example, via logic synthesis and may be embodied by digital logic. For example, the logic block 100 of FIG. 1 may be designed with reference to a standard cell library, which defines a plurality of logic gates, and may be embodied by various combinations of selected ones of the logic gates. As shown in FIG. 1, the logic block 100 may include a plurality of PUF cells 110 and a combination circuit 120.

The plurality of PUF cells 110 may output cell signals having unique levels based on activated enable signals ENAs. For example, a first PUF cell 110_1 may output a first cell signal CS1 having a unique level based on an activated enable signal corresponding thereto, from among the enable signals ENAs. As described below with reference to FIGS. 2A to 2D, the first PUF cell 110_1 may include at least one logic gate, and the unique level of the first cell signal CS1 may be determined based on a threshold level of at least one logic gate. A threshold level of a logic gate may correspond to a voltage level serving as a basis for determining whether the logic gate is logic high or logic low.

In some embodiments, the first PUF cell 110_1 may generate a signal having a threshold level of one logic gate. The generated signal may be processed based on a threshold level of another logic gate. Thus, an operation where a logic gate processes a signal received based on a threshold level of the logic gate and generates an output signal may be referred to as propagation or amplification. As described below with reference to FIGS. 2A to 2D, each of the plurality of PUF cells 110 may include a source section that generates a signal having threshold level and a propagation section that compares the generated threshold level with at least one different threshold level. In some embodiments, the plurality of PUF cells 110 may have the same structure.

Variations of one or more features (e.g., variations in height, width, length, and dopant concentration) may occur in transistors and patterns in the logic block 100 of an IC manufactured by a semiconductor process. Also, variations may occur in transistors and patterns in each of logic blocks manufactured by the same semiconductor process. Thus, the logic gates including the transistors and the patterns may respectively have different threshold levels in the logic block 100 or between logic blocks. Also, each of the cell signals output by the plurality of PUF cells 110 may have a unique level.

For example, in the logic block 100, first to k-th cell signal CS1 to CSk output by the first to k-th PUF cells 110_1 to 110_k may respectively have different levels between a negative power supply voltage (or a ground voltage) and a positive power supply voltage (or a power supply voltage) of the logic block 100. Furthermore, the first to k-th cell signals CS1 to CSk may have different levels from cell signals generated by PUF cells in a different logic block manufactured during the semiconductor process by which the logic block 100 of FIG. 1 is manufactured. Thus, a key KEY generated based on the first to k-th cell signals CS1 to CSk may have a unique value of the IC 10.

In some embodiments, the plurality of PUF cells 110 may output cell signals having predefined levels based on deactivated enable signals ENAs. For example, when one of the enable signals ENAs (e.g., one which corresponds to the first PUF cell 110_1) is deactivated, the first PUF cell 110_1 may output the first cell signal CS1 having a predefined first logic level (e.g., a logic high level). In some embodiments, the plurality of PUF cells 110 may have the same structure. Thus, PUF cells that have received a deactivated enable signal, from among the plurality of PUF cells 110, may output cell signals having the first logic level.

The combination circuit 120 may include a logic gate and generate an output signal OUT corresponding to at least one of a plurality of cell signals from the plurality of PUF cells 110. For example, the first cell signal CS1 may have a first logic level due to a deactivated enable signal, and the combination circuit 120 may generate an output signal OUT independently of the first logic level. For example, the combination circuit 120 may generate an output signal OUT which is dependent only on a level of a cell signal output by a PUF cell that has received a deactivated enable signal. Thus, the controller 200 may control the enable signals ENAs and receive an output signal OUT corresponding to a cell signal output by a desired PUF cell of the plurality of PUF cells 110.

In at least one embodiment, the operation of receiving, by the controller 200, the output signal OUT corresponding to the cell signal of the desired PUF cell by controlling the enable signals ENAs may be considered as reading the desired PUF cell. Furthermore, as described below with reference to FIGS. 4A and 4B, the combination circuit 120 may function not only to select at least one of the plurality of cell signals but also to amplify each of the plurality of cell signals.

The combination circuit 120 may include logic gates. As described above, the combination circuit 120 may generate an output signal OUT, which is dependent on at least one of a plurality of cell signals, without an additional selection signal (e.g., a selection signal of a multiplexer). Thus, the combination circuit 120 may have a smaller area (or a smaller gate count) than that of a multiplexer serving the same function as the combination circuit 120. For example, to cover a vast number of ICs manufactured by using the same process, the logic block 100 may include a plurality of PUF cells. As a result, the area of a circuit portion for selecting cell signals output by the plurality of PUF cells may be dominant in the logic block 100. Thus, the combination circuit 120 having the smaller area than that of the multiplexer may reduce the area of the logic block 100 to a marked extent (e.g., about 40% or more).

As described above, the logic block 100 may include a digital circuit, e.g., one or more logic gates. In one embodiment, a circuit (e.g., a comparator, an analog multiplexer, a capacitor, and/or a resistor) to process an analog signal may be omitted from the logic block 100. Thus, the logic block 100 may be embodied in an easy manner and have robust characteristics. Also, due to a reduced area of the IC 10, the IC 10 may be used in many and diverse applications, e.g., smart cards, Internet of things (IoT) devices, or other applications.

The controller 200 may provide enable signals ENAs to the logic block 100 and generate a key KEY based on an output signal OUT from the logic block 100. For example, the controller 200 may activate at least one of the enable signals ENAs and may receive an output signal OUT corresponding to a cell signal output by at least one of the plurality of PUF cells 110 of the logic block 100. The controller 200 may control the enable signals ENAs and generate the key KEY from values of output signals OUT that are received plural times. Examples of operations of the controller 200 will be described with reference to FIG. 7.

FIGS. 2A to 2D illustrate embodiments of a PUF cell, which, for example, may be representative of the PUF cells in logic block 100. Specifically, FIGS. 2A to 2D illustrate examples of the first PUF cell 110_1 of FIG. 1. It will be understood that the examples of FIGS. 2A to 2D may be applied to other PUF cells of FIG. 1.

Referring to FIGS. 2A to 2D, the PUF cell may include a logic gate to invert an input signal and generate an output signal. The PUF cell may connect an input and an output of the logic gate and generate a signal having a threshold level of the logic gate. Also, to increase entropy of a cell signal, the signal having the threshold level of the logic gate may be compared with a threshold level of another logic gate having the same structure as the logic gate, and a cell signal may be generated based on the comparison result. In FIGS. 2A to 2D, first PUF cells 110_1a, 110_1b, 110_1c, and 110_1d may receive a first enable signal ENA1 and output a first cell signal CS1.

Figure 2A:
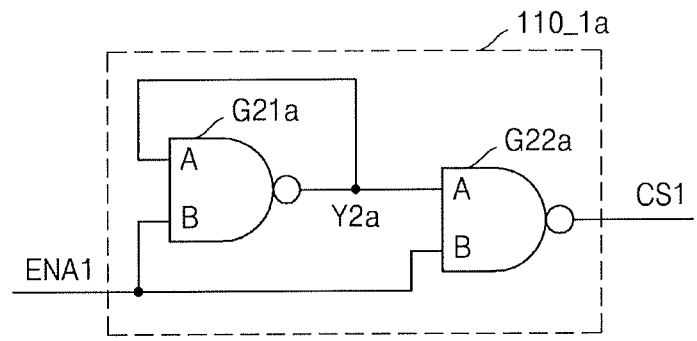
FIGS. 2A to 2D illustrate examples of a PUF cell.

Referring to FIG. 2A, the first PUF cell 110_1a may include first and second NAND gates G21a and G22a, which may be same type of NAND gate, e.g., the first and second NAND gates G21a and G22a may have the same structure. The first NAND gate G21a may have an input A connected to an output and an input B to receive the first enable signal ENA1, and may output a signal Y2a. The second NAND gate G22a may have an input A to receive the signal Y2a output by the first NAND gate G21a and an input B to receive the first enable signal ENA1, and may output the first cell signal CS1. Thus, when the first enable signal ENA1 is at a logic low, the first cell signal CS1 may be at a logic high. When the first enable signal ENA1 is at a logic high, the first cell signal CS1 may be dependent on the signal Y2a output by the first NAND gate G21a. Thus, in the first PUF cell 110_1a of FIG. 2A, the first enable signal ENA1 may be an active high signal. In one embodiment, an activated first enable signal ENA1 indicates the selection of the first PUF cell 110_1a and may be at a logic high. A deactivated first enable signal ENA1 indicates non-selection of the first PUF cell 110_1a and may be at a logic low.

When the first enable signal ENA1 is at a logic low (or deactivated), the signal Y2a output by the first NAND gate G21a may be at a logic high. When the first enable signal ENA1 is at a logic high (or activated), the first NAND gate G21a may function as an inverter to output a signal obtained by inverting a signal received through the input A. Since the input A of the first NAND gate G21a is connected to the output, when the first enable signal ENA1 is at a logic high, the signal Y2a may have a threshold level related to the input A of the first NAND gate G21a. For example, after a convergence time has elapsed from a time point in which power is supplied to the first NAND gate G21a or the first enable signal ENA1 is changed from a logic low to a logic high, the signal Y2a may have a threshold level related to the input A. When the signal Y2a has the threshold level, the signal Y2a may be interpreted as having a metastable state.

As described above with reference to FIG. 1, even when each of the plurality of PUF cells 110 of FIG. 1 has the same structure as the first PUF cell 110_1a of FIG. 2A, the first NAND gates in the respective PUF cells 110 may not be physically completely identical. Thus, output signals of the first NAND gates of the plurality of PUF cells 110 may have different levels.

When the first enable signal ENA1 is at a logic high, the second NAND gate G22a may function as an inverter to invert the signal Y2a received through the input A, and may output the first cell signal CS1. The second NAND gate G22a may invert the signal Y2a according to a threshold level related to the input A, and the signal Y2a may have a threshold level of the first NAND gate G21a. Thus, the level of the first cell signal CS1 may be determined by the threshold level of the first NAND gate G21a (that is related to the input A) and a threshold level of the second NAND gate G22a (that is related to the input A).

For example, when the threshold level of the first NAND gate G21a is higher than the threshold level of the second NAND gate G22a, the first cell signal CS1 may be at a logic low. Otherwise, the first cell signal CS1 may be at a logic high. When the difference between the threshold level of the first NAND gate G21a and the threshold level of the second NAND gate G22a is slight (e.g., lower than a predetermined level), the first cell signal CS1 may have a level between a logic high and a logic low and be in a metastable state. Thus, the operation of outputting, by the second NAND gate G22a, the first cell signal CS1 based on the signal Y2a having the metastable state may be interpreted as amplifying or propagating the signal Y2a.

In some embodiments, as described with reference to FIG. 3A, a PUF cell may include at least two cascaded logic gates to propagate (or amplify) signals like the second NAND gate G22a. According to an embodiment, unlike in FIG. 2A, the inputs B of the first and second NAND gate G21a and G22a may be used to generate and amplify signals having threshold levels.

In some embodiments, inputs of logic gates used to generate and amplify the signals having the threshold levels may be of the same type. For example, as shown in FIG. 2A, the input A of the first NAND gate G21a may be used to generate the signal Y2a having the threshold level of the first NAND gate G21a, and the input A of the second NAND gate G22a may be used to propagate the signal Y2a. In some embodiments, a logic gate may have different threshold levels according to inputs due to an asymmetrical structure about the inputs. When differences between threshold levels in accordance with the inputs are large (e.g., above a predetermined level) or have a consistent direction in one logic gate, a signal obtained by amplifying a signal having a threshold level related to another input may have a fixed level. This may cause entropy to be reduced. Thus, in some embodiments, in order to increase an entropy of a cell signal, inputs (e.g., inputs A in FIG. 2A) of logic gates used to generate and propagate signals having threshold levels in a PUF cell may be of the same type. As a result, inputs of the logic gates that receive enable signals may also be of the same type.

Figure 2B:
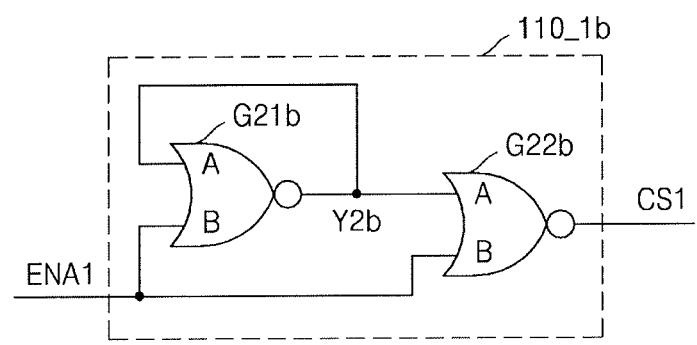

Referring to FIG. 2B, the first PUF cell 110_1b may include first and second NOR gates G21b and G22b, which may be the type of NOR gate. Similar to the first PUF cell 110_1a of FIG. 2A, the first and second NOR gates G21b and G22b of the first PUF cell 110_1b may be connected to each other. When a first enable signal ENA1 is at a logic high, the first cell signal CS1 may be at a logic low. When the first enable signal ENA1 is at a logic low, the first cell signal CS1 may be dependent on a signal Y2b output by the first NOR gate G21b. Thus, unlike the first PUF cell 110_1a of FIG. 2A, in the first PUF cell 110_1b of FIG. 2B, the first enable signal ENA1 may be an active low signal. An activated first enable signal ENA1 may indicate the selection of the first PUF cell 110_1b and may be at a logic low. A deactivated first enable signal ENA1 may indicate non-selection of the first PUF cell 110_1b and may be at a logic high.

When the first enable signal ENA1 is at a logic low (or activated), each of the first and second NOR gates G21b and G22b may function as an inverter to output a signal obtained by inverting a signal received through the input A. Since the input A of the first NOR gate G21b is connected to the output, the first NOR gate G21b may output the signal Y2b having a threshold level related to the input A of the first NOR gate G21a. The second NOR gate G22b may invert the signal Y2b according to the threshold level related to the input A and output the first cell signal CS1. According to embodiments, unlike shown in FIG. 2B, inputs B of the first and second NOR gates G21b and G22b may be used to generate and amplify signals having threshold levels.

Figure 2C:
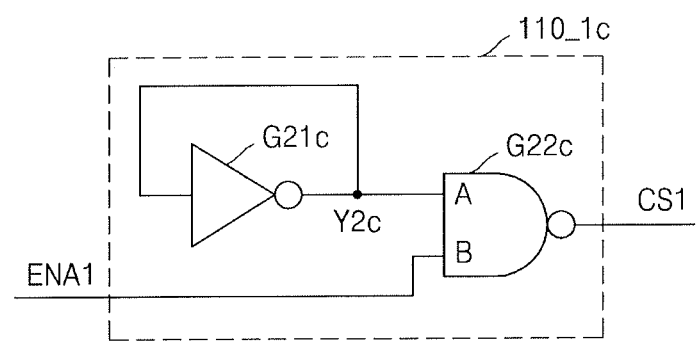

Referring to FIG. 2C, in some embodiments, a PUF cell may include different logic gates having the same threshold level. For example, as shown in FIG. 2C, the first PUF cell 110_1c may include an inverter G21c which may output a signal Y2c and a NAND gate G22c, and a threshold level of the inverter G21c may be approximately equal to a threshold level of the NAND gate G22c. When all threshold levels of different logic gates manufactured by the same semiconductor process has a ±deviation, the PUF cell may include different logic gates.

In some embodiments, the NAND gate G22c may be an isolation (ISO) logic gate configured such that a signal output by the power gated block (e.g., B110 in FIG. 2D) from which power supply is cut off has a fixed logic level. Similar to the first PUF cell 110_1a of FIG. 2A, a first enable signal ENA1 may be an active high signal in the first PUF cell 110_1c of FIG. 2C. According to embodiments, unlike in FIG. 2C, an input B of the NAND gate G22c may be used to amplify a signal having a threshold level.

Figure 2D:
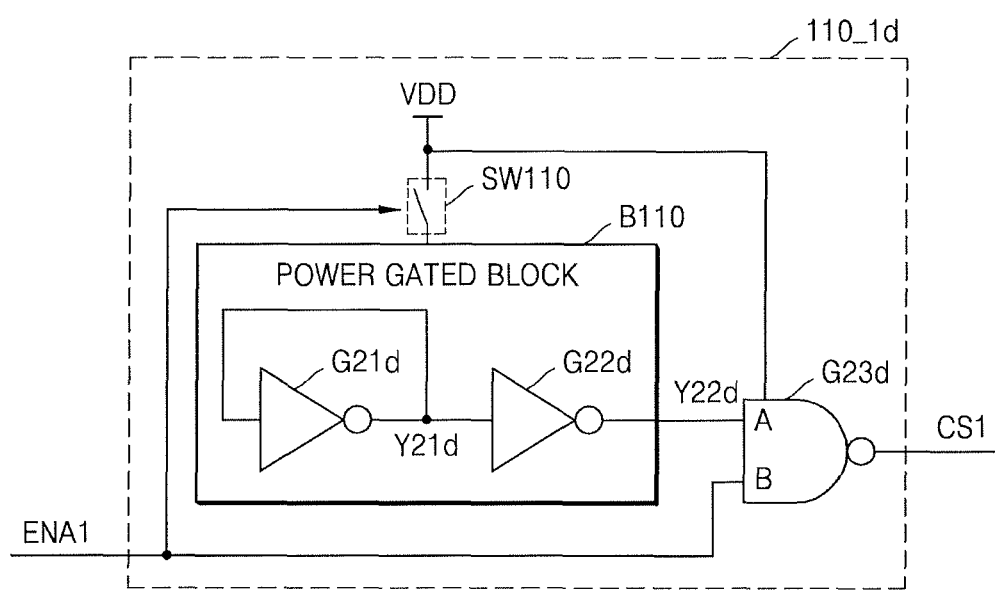

Referring to FIG. 2D, a PUF cell may include a power gated block including logic gates which generates and amplifies threshold levels of the logic gates. Power may be supplied to or cut off from the power gated block based on an enable signal. For example, as shown in FIG. 2D, the first PUF cell 110_1d may include a power gated block B110 and a switch SW110. The switch SW110 may control supply of a power supply voltage VDD to the power gated block B110 based on an activated first enable signal ENA1, and may block supply of the power supply voltage VDD based on a deactivated first enable signal ENA1.

The power gated block B110 may include first and second inverters G21d and G22d to and from which the power supply voltage VDD is supplied or cut off based on the first enable signal ENA1. The first inverter G21d may output a signal Y21d having a threshold level of the first inverter G21d. The second inverter G22d may invert the signal Y21d based on the threshold level of the second inverter G22d and output a signal Y22d. Unlike in FIG. 2D, in some embodiments, the first PUF cell 110_1 of FIG. 1 may include a power gated block to and from which a ground voltage GND is supplied or cut off based on the first enable signal ENA1. In some embodiments, the first PUF cell 110_1 of FIG. 1 may include a power gated block to and from which both the power supply voltage VDD and the ground voltage GND are supplied or cut off based on the first enable signal ENA1.

A NAND gate G23d (which may be an ISO logic gate) may function as an inverter to invert the signal Y22d and output the first cell signal CS1 based on an activated (e.g., logic-high) first enable signal ENA1. The NAND gate G23d may output a logic-high first cell signal CS1 based on a deactivated (e.g., logic-low) first enable signal ENA1. Thus, even when the supply of power to the first and second inverters G21d and G22d is cut off based on the deactivated first enable signal ENA1, the first cell signal CS1 may be at a level fixed by the NAND gate G23d, e.g., a logic high.

As shown in FIG. 2D, the logic gates used to generate and amplify the threshold levels may be in the power gated block. When power supplied to the logic gates is cut off based on a deactivated enable signal while a cell signal of the PUF cell corresponding to the power gated block is not used, bias temperature instability (BTI) aging may be prevented. Threshold levels of the first and second inverters G21d and G22d may be determined not only by PMOS transistors and NMOS transistors in the first and second inverters G21d and G22d, but also by various factors such as, for example, current between a power supply voltage VDD and a ground voltage GND. Thus, robust characteristics of the first PUF cell 110_1d may be improved by preventing BTI aging.

Figure 3A:
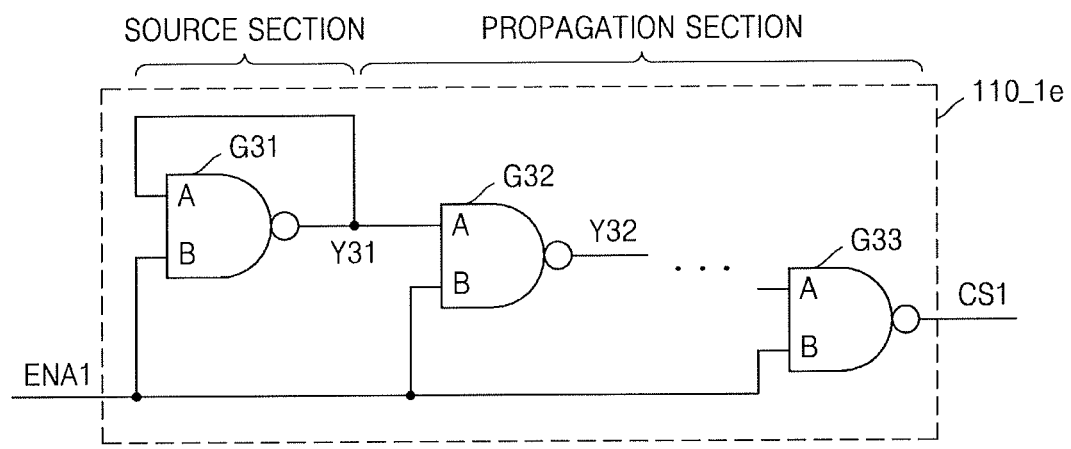
FIG. 3A illustrates another example of a PUF cell and FIG. 3B illustrates examples of levels of internal signals of a PUF cell.
Figure 3B:
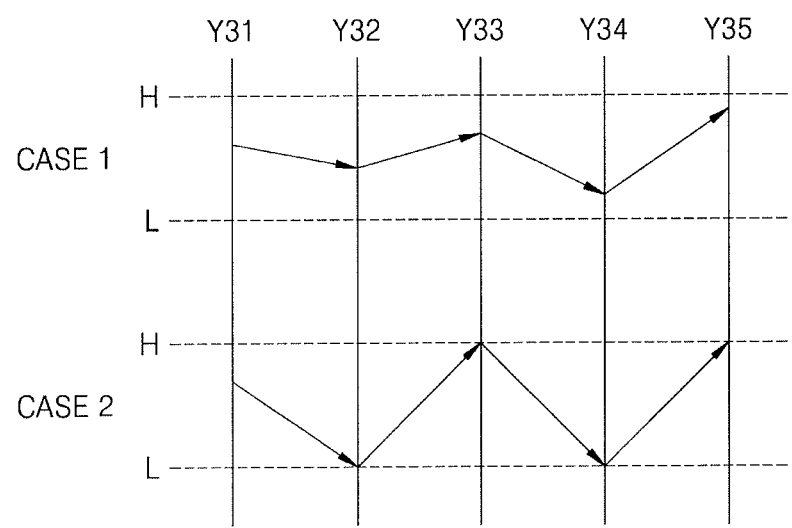

FIG. 3A illustrates another embodiment of a PUF cell, which, for example, may be representative of the PUF cells in the logic block 100 of FIG. 1. FIG. 3B illustrates examples of levels of internal signals of the PUF cell of FIG. 1. Specifically, FIG. 3A illustrates an example of the first PUF cell 110_1 of FIG. 1, and FIG. 3B illustrates examples of the levels of the internal signals of the first PUF cell 110_1e of FIG. 3A. The example of FIG. 3A may be applied to other PUF cells of FIG. 1.

Referring to FIG. 3A, the first PUF cell 110_1e may include a plurality of NAND gates G31 to G33 and may be divided into a source section and a propagation section. Each of the plurality of NAND gates G31 to G33 may have an input B to receive a first enable signal ENA1 and may function as an inverter to invert a signal received through an input A based on an activated (e.g., logic-high) first enable signal ENA1.

A first NAND gate G31 in the source section may output a signal Y31 having a threshold level related to the input A. A second NAND gate G32 in the propagation section may invert the signal Y31 based on the threshold level related to the input A and output a signal Y32. As shown in FIG. 3A, the propagation section may include at least two cascaded NAND gates, and a final NAND gate G33 may output a first cell signal CS1.

FIG. 3B illustrates examples of output signals of NAND gates in the source section and the propagation section of FIG. 3A. First and second cases of FIG. 3B are examples for the purpose of illustrations only. Internal signals of the first PUF cell 110_1e of FIG. 3A may be different from the signals of FIG. 3B in other embodiments.

Referring to the first case of FIG. 3B, the signal Y31 output by the first NAND gate G31 in the source section may be gradually amplified by the NAND gates in the propagation section. For example, output signals Y32 to Y35 output by the NAND gates of the propagation section may have levels that become gradually closer to a logic high H or a logic low L.

Referring to the second case of FIG. 3B, the signal Y31 output by the first NAND gate G31 in the source section may be amplified to a logic-high (H) or logic-low (L) signal by the NAND gates in the propagation section. For example, the second NAND gate G32 may output a logic-low (L) signal Y32 when a threshold level related to the input A of the first NAND gate G31 is higher than a threshold level related to the input A of the second NAND gate G32 and there is a large difference (e.g., greater than a predetermined value) between the two threshold levels, as shown in the second case of FIG. 3B. NAND gates of the propagation section, which are subsequent to the second NAND gate G32, may output logic-high (H) or logic-low (L) signals Y33 to Y35.

Figure 4A:
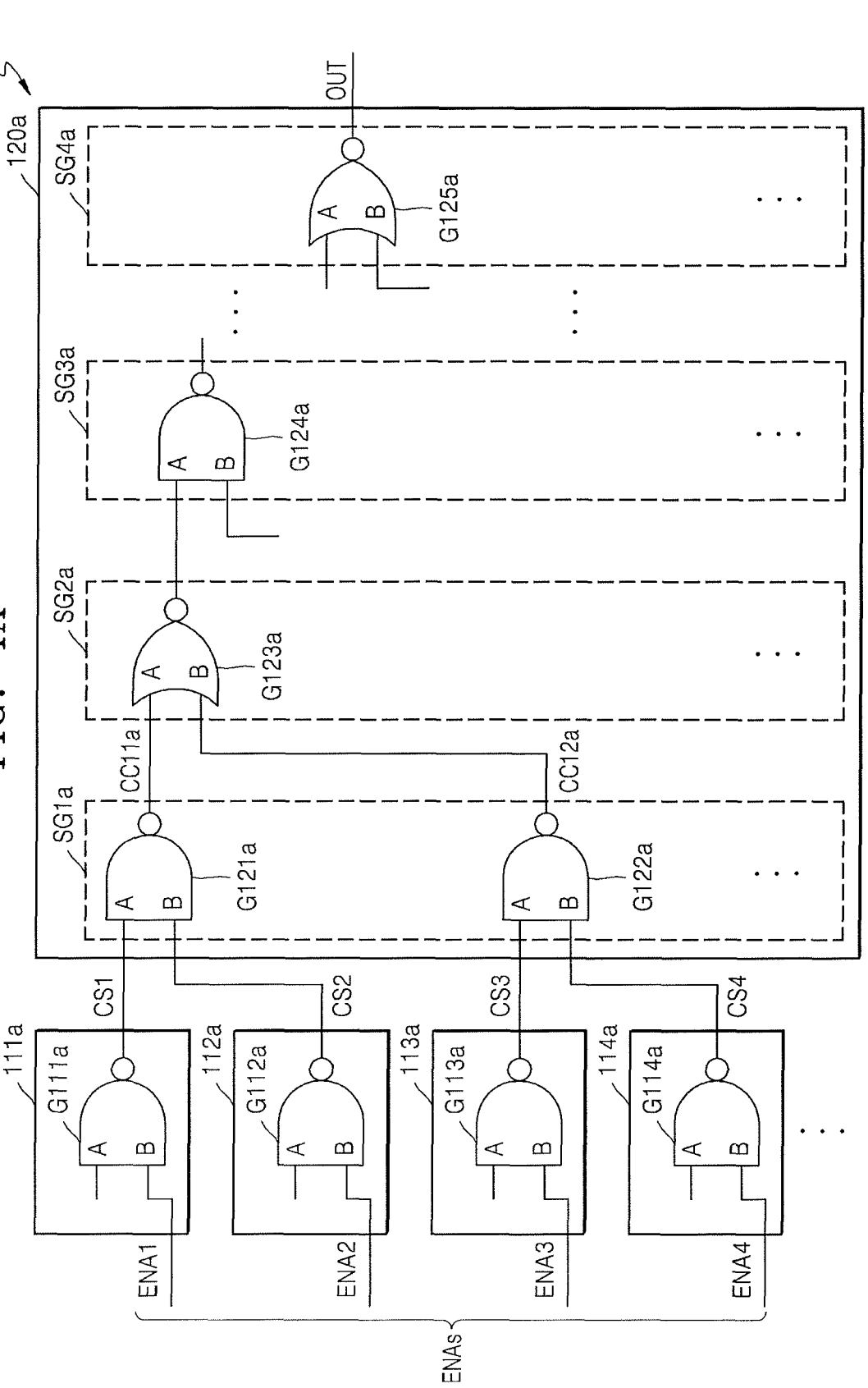
FIGS. 4A and 4B illustrate examples of logic blocks.
Figure 4B:
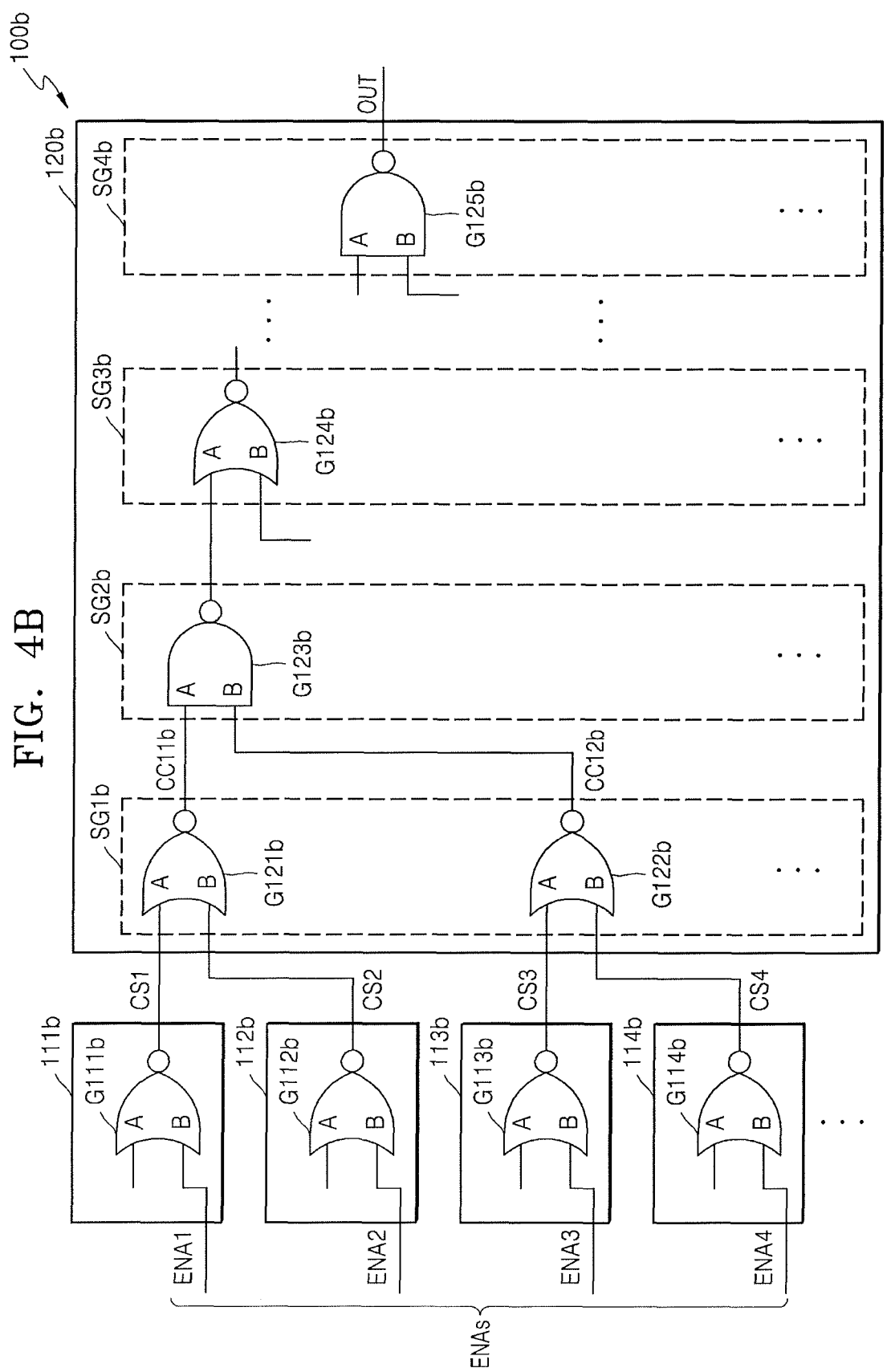

FIGS. 4A and 4B illustrate additional embodiments of the logic block 100 of FIG. 1. FIG. 4A illustrates a logic block 100a that includes PUF cells, each of which includes a NAND gate to output a cell signal. FIG. 4B illustrates a logic block 100b that includes PUF cells, each of which includes a NOR gate to output a cell signal. FIGS. 4A and 4B illustrate four PUF cells and only a final logic gate of each of the PUF cells for outputting a cell signal. A different number of PUF cells may be included in other logic block embodiments.

Referring to FIG. 4A, the logic block 100a may include a plurality of PUF cells 111a to 114a and a combination circuit 120a. The plurality of PUF cells 111a to 114a may include NAND gates G111a to G114a to output cell signals CS1 to CS4, respectively. Thus, enable signals ENAs may be active high signals, and an enable signal provided to a PUF cell selected out of the plurality of PUF cells 111a to 114a may be at a logic high. For example, a first PUF cell 111a may output a first cell signal CS1 having a unique level based on a logic-high first enable signal ENA1. Similarly, second to fourth PUF cells 112a to 114a may output second to fourth cell signals CS2 to CS4 having unique levels based on logic-high second to fourth enable signals ENA2 to ENA4, respectively.

The combination circuit 120a may include a series of stages SG1a to SG4a, and logic gates in the series of stages SG1a to SG4a may be connected to one another, for example, by a tree structure. As described above with reference to FIG. 1, the combination circuit 120a may generate an output signal OUT independently of a cell signal output by an unselected PUF cell, e.g., a PUF cell that has received a deactivated enable signal.

Thus, as shown in FIG. 4A, when the first to fourth cell signals CS1 to CS4 of the first to fourth PUF cells 111a to 114a are output by the NAND gates G111a to G114a, the first stage SG1a of the combination circuit 120a may include NAND gates G121a and G122a to receive the first to fourth cell signals CS1 to CS4. For example, in the example of FIG. 4A, since the cell signal output based on the deactivated enable signal is at a logic high, the first stage SG1a may include NAND gates G121a and G122a so that the output signal OUT may be dependent on a cell signal corresponding to an activated enable signal. Signals (e.g., CC11a and CC12a) output by the series of stages SG1a and SG4a of the combination circuit 120a may be referred to as combination signals.

Since a NAND gate that receives only logic-high cell signals, from among the NAND gates G121a and G122a of the first stage SG1a, outputs a logic-low signal, the second stage SG2a may include a NOR gate G123a unlike the first stage SG1a. For example, when the first enable signal ENA1 is activated and the second to fourth enable signals ENA2 to ENA4 are deactivated, the second to fourth cell signals CS2 to CS4 may be at a logic high. Thus, the NAND gate G122a of the first stage SG1a may output a logic-low signal (or a first combination signal) CC12a. To transmit the signal (or the first combination signal) CC11a (which is dependent on the first cell signal CS1) to the third stage SG3a, the second stage SG2a may include a NOR gate G123a that is independent of a logic-low signal CC12a. Similarly, the third stage SG3a may include a NAND gate G124a.

As a result, the series of stages SG1a to SG4a of the combination circuit 120a may alternately include NAND gates and NOR gates. Thus, the combination circuit 120a may generate an output signal OUT that is dependent on a cell signal output by a PUF cell, which is selected based on the enable signals ENAs without an additional selection signal.

FIG. 4A illustrates an example in which a final stage SG4a of the combination circuit 120a, which outputs the output signal OUT, includes a NOR gate G125a. However, in some embodiments, the final stage SG4a of the combination circuit 120a may include a NAND gate. For example, since the series of stages SG1a to SG4a of the combination circuit 120a alternately include NAND gates and NOR gates, the kind of a logic gate in the final stage SG4a may be determined by the number of cell signals (or the number of PUF cells). FIG. 4A illustrates an example in which the combination circuit 120a includes a 2-input NAND gate and a 2-input NOR gate. However, in some embodiments, the combination circuit 120a may include AND gates. In other embodiments, the combination circuit 120a may include a logic gate having a different number of (e.g., at least three) inputs.

Referring to FIG. 4B, the logic block 100b may include a plurality of PUF cells, for example, first to fourth PUF cells 111b to 114b and a combination circuit 120b. The first to fourth PUF cells 111b to 114b may include NOR gates G111b to G114b to output cell signals CS1 to CS4, respectively. Thus, enable signals ENAs may be active low signals, and an enable signal provided to a PUF cell selected out of the first to fourth PUF cells 111b to 114b may be at a logic low.

The combination circuit 120b may include a series of stages SG1b to SG4b, and logic gates in the series of stages SG1b to SG4b may be connected to one another, for example, by a tree structure. As shown in FIG. 4B, when first to fourth cell signals CS1 to CS4 of the first to fourth PUF cells 111b to 114b are output by the NOR gates G111b to G114b, a first stage SG1b of the combination circuit 120b may include NOR gates CC11b and CC12b to receive the first to fourth cell signals CS1 to CS4. For example, in the example of FIG. 4B, since a cell signal output based on a deactivated enable signal is at a logic low, the first stage SG1b may include NOR gates G121b and G122b so that an output signal OUT may be dependent on a cell signal corresponding to an activated enable signal.

Similar to the combination circuit 120a of FIG. 4A, the series of stages SG1b to SG4b of the combination circuit 120b of FIG. 4B may alternately include NOR gates and NAND gates. Specifically, the first stage SG1b may include NOR gates (e.g., G121b), the second stage SG2b may include NAND gates (e.g., G123b), and the third stage SG3b may include NOR gates (e.g., G124b). FIG. 4B illustrates an example in which a final stage SG4b of the combination circuit 120b, which outputs the output signal OUT, includes a NAND gate G125b. However, the final stage SG4b of the combination circuit 120b may include NOR gates according to the number of PUF cells.

Figure 5A:
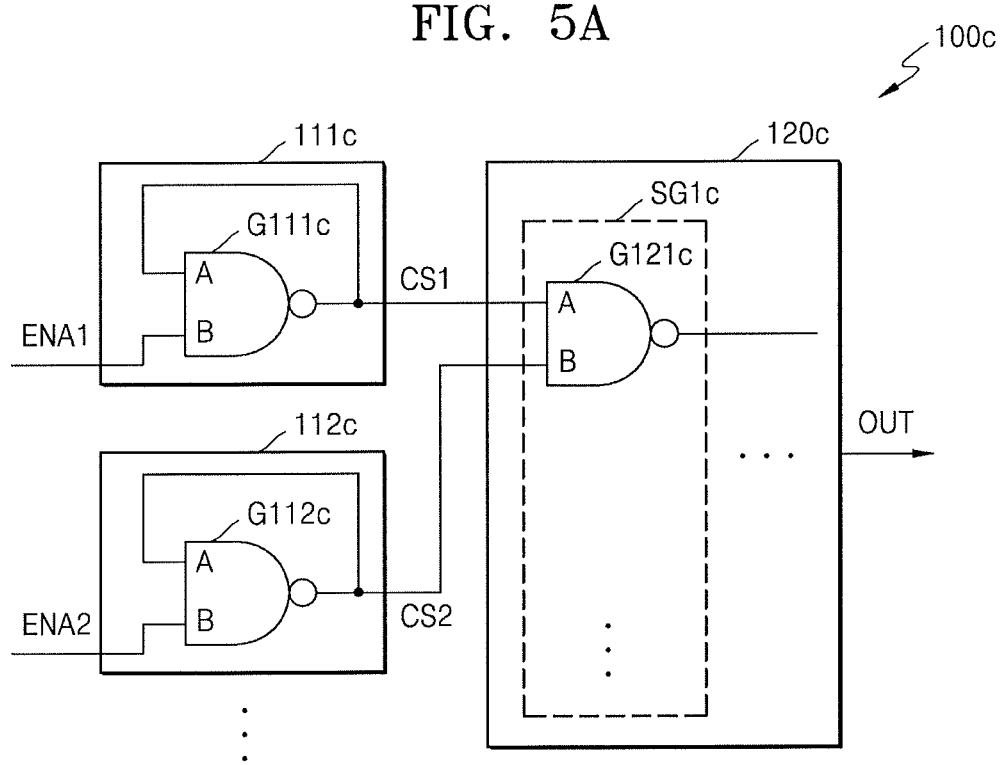
FIGS. 5A and 5B illustrate additional examples of logic blocks.
Figure 5B:
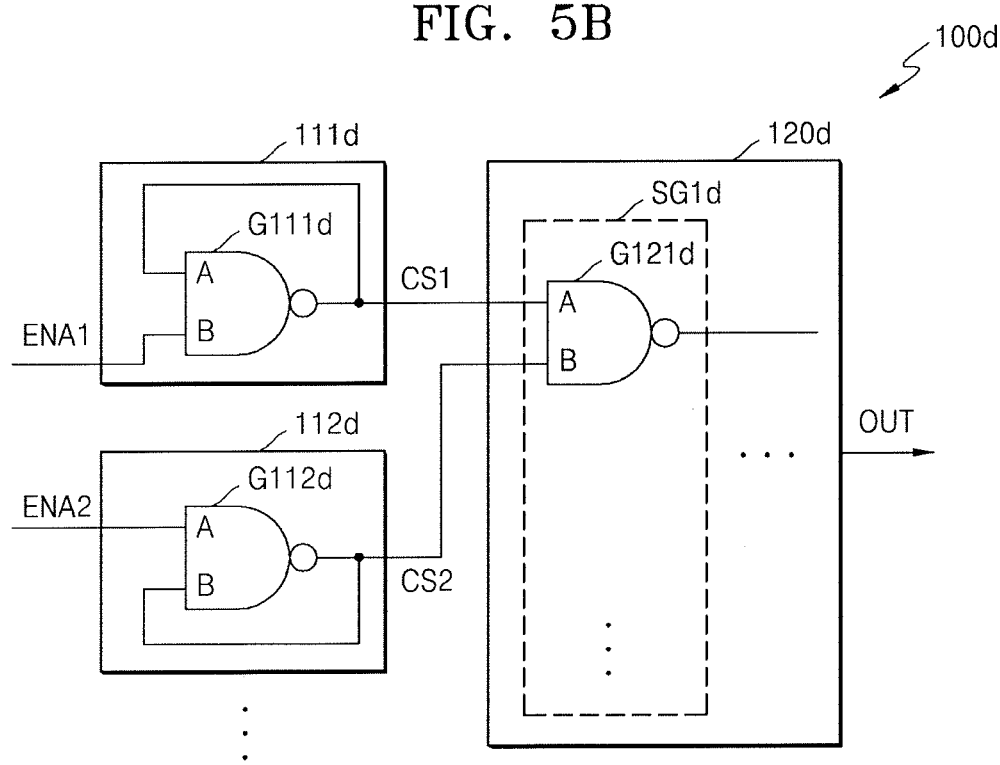

FIGS. 5A and 5B illustrate additional embodiments of the logic block 100 of FIG. 1. Specifically, FIGS. 5A and 5B illustrate logic blocks 100c and 100d, respectively, each of which includes a PUF cell including one NAND gate. In other embodiments, the logic blocks 100c and 100d may be applied to a PUF cell including a logic gate (e.g., a NOR gate) different from a NAND gate.

Referring to FIG. 5A, the logic block 100c may include first and second PUF cells 111c and 112c and a combination circuit 120c. The first and second PUF cells 111c and 112c may include NAND gates G111c and G112c, respectively, which may receive first and second enable signals ENA1 and ENA2 through inputs B thereof. Each of the NAND gates G111c and G112c may have an input A connected to an output thereof. The NAND gates G111c and G112c may output first and second cell signals CS1 and CS2, respectively. Thus, the first and second cell signals CS1 and CS2 may have threshold levels related to the inputs A of the NAND gates G111c and G112c based on activated first and second enable signals ENA1 and ENA2, respectively. FIG. 5A illustrates an example in which each of the first and second PUF cells 111c and 112c includes one NAND gate G111c or G112c. However, in other embodiments, each of the first and second PUF cells 111c and 112c may include at least one additional logic gate (e.g., NAND gate) to amplify an output signal of the NAND gate G111c or G112c.

A first stage SG1c of the combination circuit 120c may function not only to combine at least two cell signals, but also to propagate (or amplify) the at least two cell signals. For example, when the first enable signal ENA1 is activated, the first cell signal CS1 may have a threshold level related to the input A of the NAND gate G111c. Unlike shown in FIG. 5A, when the first PUF cell 111c further includes at least one logic gate (e.g., at least one NAND gate) in the propagation section, a first cell signal CS1, which is not sufficiently amplified by the at least one logic gate in the propagation section, may be output by the first PUF cell 111c. Thus, a NAND gate G121c of the first stage SG1c may process the first cell signal CS1 according to a threshold level related to an input A thereof, and may function to propagate (or amplify) the first cell signal CS1. Similarly, the NAND gate G121c of the first stage SG1c may process the second cell signal CS2 according to a threshold level related to an input B thereof.

Accordingly, in some embodiments, the NAND gate G121c in the first stage SG1c of the combination circuit 120c may have the same structure as the NAND gates in the first and second PUF cells 111c and 112c. That is, logic gates in the first stage SG1c of the combination circuit 120c and logic gates in the first and second PUF cells 111c and 112c may be the same type of logic gate.

Referring to FIG. 5B, a logic block 100d may include first and second PUF cells 111d and 112d and a combination circuit 120d. The first PUF cell 111d may have an input A connected to an output thereof and an input B to receive a first enable signal ENA1. The second PUF cell 112d may have an input A to receive a second enable signal ENA2 and an input B connected to an output thereof. Similar to the combination circuit 120c of FIG. 5A, a NAND gate G121d in a first stage SG1d of the combination circuit 120d of FIG. 5B may function to propagate (or amplify) first and second cell signals CS1 and CS2.

As described above with reference to FIG. 2A, a logic gate may have an asymmetrical structure about inputs and have different threshold levels according to the inputs. Since the second cell signal CS2 output by the second PUF cell 112d is applied to an input B of the NAND gate G121d of the first stage SG1d, as shown in FIG. 5B, the NAND gate G112d in the second PUF cell 112d may have an input B connected to an output thereof. Thus, the second cell signal CS2 may have a threshold level related to the input B of the NAND gate G112d to increase an entropy of the output signal OUT.

Also, the first PUF cell 111d (which outputs the first cell signal CS1 to be applied to the input A of the NAND gate G121d) may include a NAND gate G111d having an input A connected to an output thereof. In some embodiments, the NAND gates G111d, G112d, and G121d may have the same structure and be of the same type of NAND gate.

Figure 6:
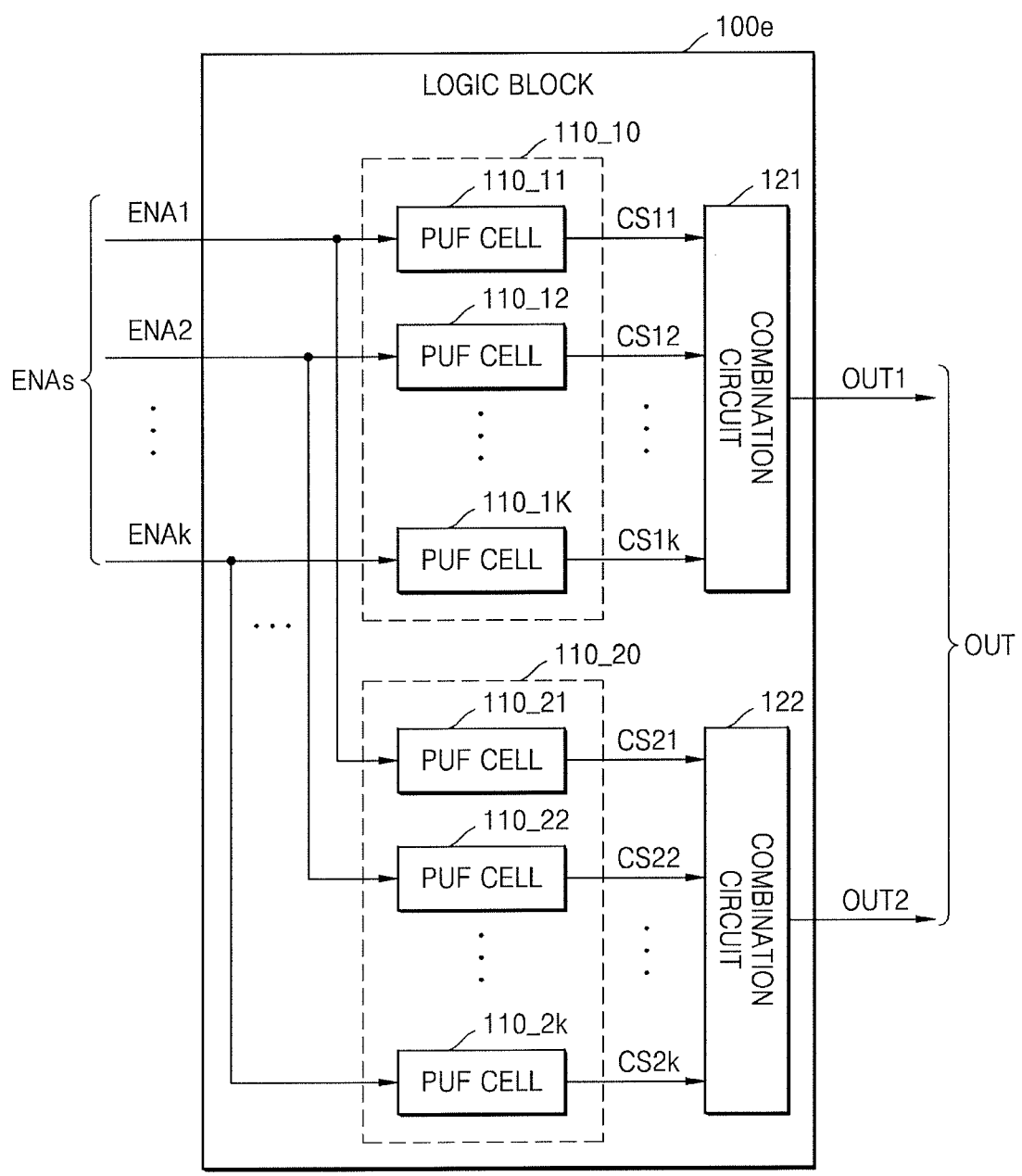
FIG. 6 illustrates an additional example of a logic block.

FIG. 6 illustrates another embodiment of the logic block 100 of FIG. 1. As described above with reference to FIG. 1, a logic block 100e of FIG. 6 may receive enable signals ENAs from the controller 200 and output an output signal OUT to the controller 200.

Referring to FIG. 6, the logic block 100e may include at least two PUF cells, among which one of the enable signals ENAs is shared, and may generate a multi-bit output signal OUT. For example, as shown in FIG. 6, the logic block 100e may receive first to k-th enable signals ENA1 to ENAk. The logic block 100e may include first and second PUF cell groups 110_10 and 110_20 to receive the first to k-th enable signals ENA1 to ENAk. The first PUF cell group 110_10 may include k PUF cells 110_11 to 110_1k, and the k PUF cells 110_11 to 110_1k may output k cell signals CS11 to CS1k. The first combination circuit 121 may generate a first output signal OUT1 based on the k cell signals CS11 to CS1k from the first PUF cell group 110_10. Similarly, the second PUF cell group 110_20 may also include k PUF cells 110_21 to 110_2k, which may output k cell signals CS21 to CS2k. A second combination circuit 122 may generate a second output signal OUT2 based on the k cell signals CS21 to CS2k received from the second PUF cell group 110_20.

A PUF cell of the first PUF cell group 110_10 and a PUP cell of the second PUF cell group 110_20, which are connected to the same enable signal, may be selected or unselected simultaneously. For example, a PUF cell 110_12 of the first PUF cell group 110_10 and a PUF cell 110_22 of the second PUF cell group 110_20, which are connected to a second enable signal ENA2, may simultaneously output cell signals CS12 and CS22 having unique levels, respectively, based on an activated second enable signal ENA2 and may simultaneously output cell signals CS12 and CS22 having predefined fixed levels (e.g., a logic high level), respectively, based on a deactivated second enable signal ENA2.

In some embodiments, the k PUF cells 110_11 to 110_1k of the first PUF cell group 110_10 and the k PUF cells 110_21 to 110_2k of the second PUF cell group 110_20 may include the same structure (e.g., same logic gate). In some embodiments, when the second PUF cell group 110_20 receives signals obtained by inverting the first to k-th enable signals ENA1 to ENAk, the k PUF cells 110_11 to 110_1k of the first PUF cell group 110_10 and the k PUF cells 110_21 to 110_2k of the second PUF cell group 110_20 may include different logic gates. For example, the k PUF cells 110_11 to 110_1k of the first PUF cell group 110_10 may include NAND gates, while the k PUF cells 110_21 to 110_2k of the second PUF cell group 110_20 may include NOR gates. FIG. 6 illustrates a logic block 100e including two PUF cell groups 110_10 and 110_20. In other embodiments, the logic block may include a different number of (e.g., at least three) PUF cell groups and may generate an output signal OUT with a different number of (e.g., at least three) bits.

Figure 7:
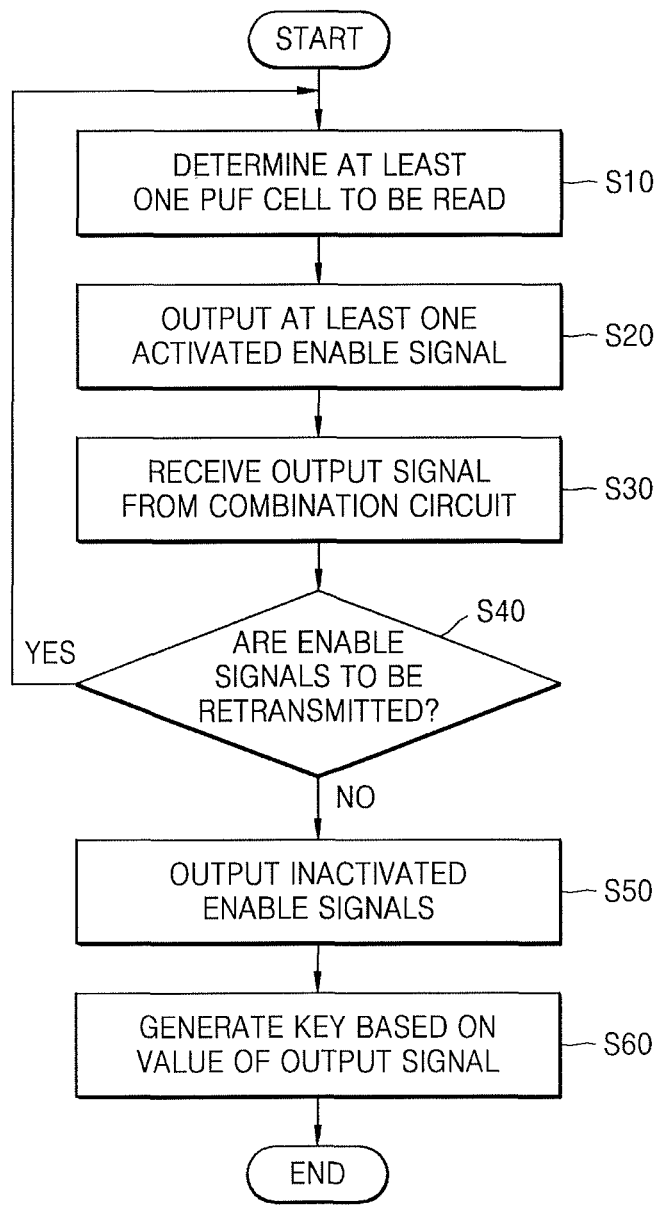
FIG. 7 illustrates an embodiment of operations performed by a controller.

FIG. 7 illustrates an example of the operation of the controller 200 of FIG. 1. As described above with reference to FIG. 1, the controller 200 may control enable signals ENAs, select at least one of a plurality of PUF cells 110, and receive an output signal OUT that is dependent on the selected PUF cell 110. The controller 200 may generate a key KEY based on the received output signal OUT.

In operation S10, an operation for determining at least one PUF cell to be read may be performed. For example, the controller 200 may control the enable signals ENAs to select at least one of the plurality of PUF cells 110 and may receive the output signal OUT that is dependent on the selected PUF cell 110. According to embodiments, the controller 200 may determine a PUF cell to be read using various methods. For example, the controller 200 may select at least one PUF cell in a predefined order or in an order that changes with respect to time. Examples of operation S10 will be described with reference to FIGS. 8A to 9B.

In operation S20, an operation for outputting at least one activated enable signal may be performed. For example, the controller 200 may activate an enable signal corresponding to the PUF cell determined in operation S10 (e.g., the PUF cell to be read) and deactivate enable signals corresponding to other PUF cells so that the PUF cell to be read may output a cell signal having a unique level. Thus, the PUF cell that has received the activated enable signal may output the cell signal having the unique level, while the PUF cells that have received the deactivated enable signals may output cell signals having fixed levels.

In operation S30, an operation for receiving an output signal OUT of a combination circuit 120 may be performed. The combination circuit 120 may generate an output signal OUT that is dependent on a cell signal corresponding to the activated enable signal output in operation S20. For example, as described above with reference to FIG. 2A, a convergence time may be required for a PUF cell of the logic block 100 to generate an internal signal having a unique threshold level. Thus, the controller 200 may latch the output signal OUT after the convergence time has elapsed. The controller 200 may store a value (e.g., a logic level) of the latched output signal OUT.

In operation S40, an operation for determining whether to retransmit enable signals may be performed. The controller 200 may determine whether to retransmit an enable signal depending on whether the collection of the values of the output signal OUT required to generate the key KEY is completed. For example, to generate the key KEY, the controller 200 may read all of the plurality of PUF cells 110 or only some of the plurality of PUF cells 110. If the enable signal is to be retransmitted, operation S10 may be subsequently performed. If the enable signal is not to be retransmitted, operation S50 may be subsequently performed.

In operation S50, an operation for outputting deactivated enable signals may be performed. For example, when the collection of values of the output signal OUT for generating the key KEY is completed, the controller 200 may output deactivated enable signals to reduce power consumed by the logic block 100. For example, in the first PUF cell 110_1a of FIG. 2A, when the first NAND gate G21a functions as an inverter based on an activated first enable signal ENA1, an input A of the first NAND gate G21a may be connected to an output to form a current path between a positive power supply voltage and a negative power supply voltage in the first NAND gate G21a. When the reading of the first PUF cell 110_1a is completed, the first enable signal ENA1 may be deactivated (e.g., changed to a logic low level), so the first NAND gate G21a may output a logic-high signal Y2a and the current path may be cut off between the positive power supply voltage and the negative power supply voltage in the first NAND gate G21a. Also, as described above with reference to FIG. 2D, when the first PUF cell 110_1d includes a power gated block B110, the deactivated first enable signal ENA1 may cut off a power supply voltage supplied to the power gated block B110, thereby reducing power consumption of the first PUF cell 110_1d.

In operation S60, an operation for generating a key KEY may be performed based on a value of the output signal OUT. The controller 200 may store values obtained by latching an output signal OUT that is received plural times based on combinations of activated enable signals and deactivated enable signals. The controller 200 may generate the key KEY based on the values of the output signal OUT, and the key KEY may have a unique value of the IC 10.

Figure 8A:
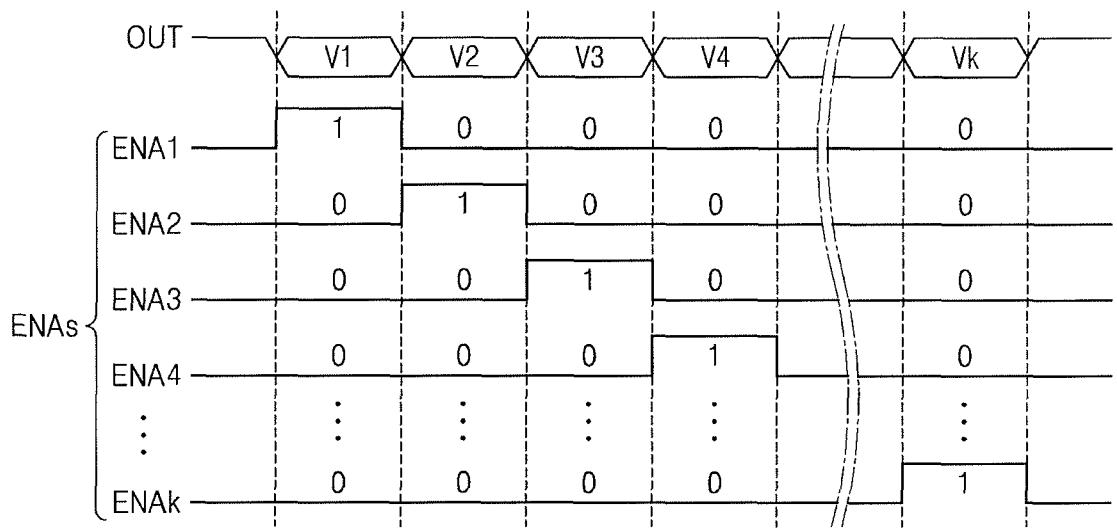
FIGS. 8A to 8C illustrate embodiments of signals for controlling a reading operation for a plurality of PUF cells.
Figure 8B:
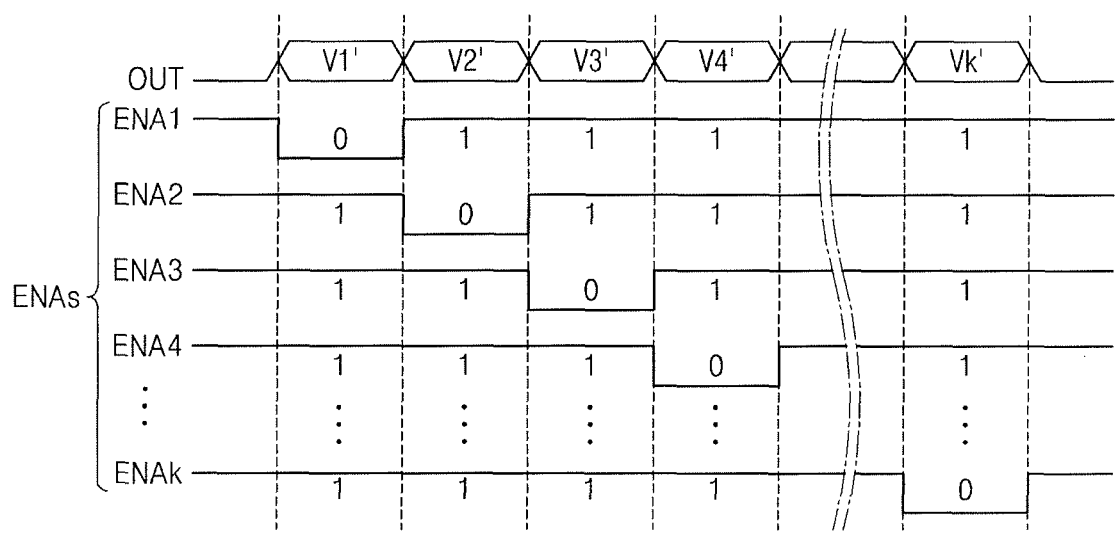
Figure 8C:
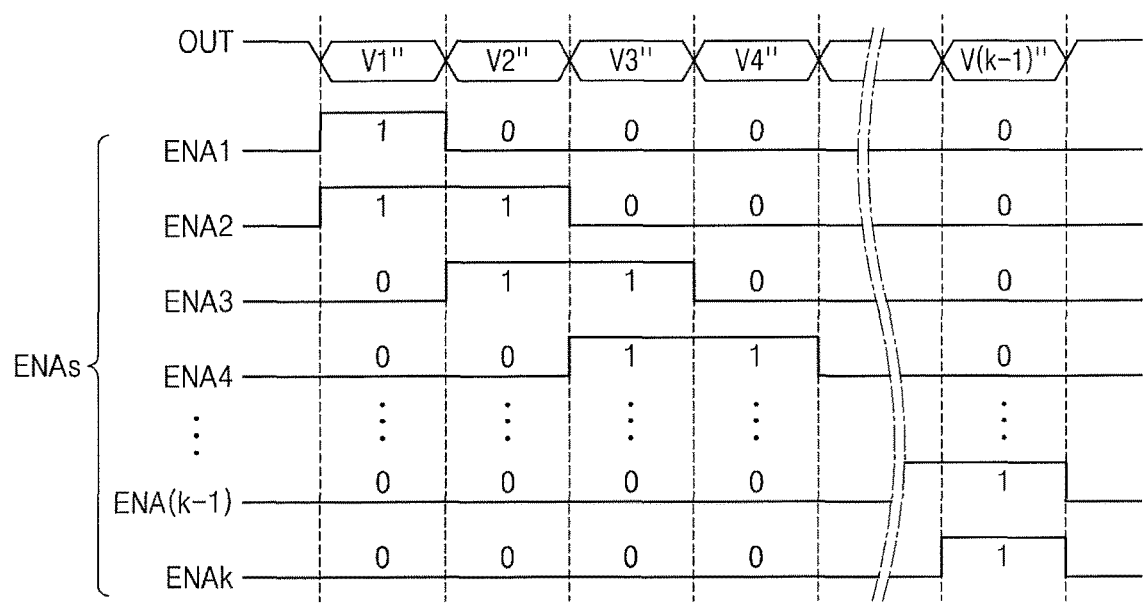

FIGS. 8A to 8C illustrate examples of timing diagrams for controlling operation for reading a plurality of PUF cells 110 using the controller 200 of FIG. 1. As described above with reference to operation S10 of FIG. 7, the controller 200 may determine at least one PUF cell to be read. In some embodiments, as shown in FIGS. 8A to 8C, the plurality of PUF cells 110 may be read in a predetermined sequential order. In FIGS. 8A to 8C, a logic high may be denoted by '1' and a logic low may be denoted by '0'. FIGS. 8A to 8C will be described with reference to FIG. 1.

Referring to FIG. 8A, first to k-th PUF cells 110_1 to 110_k may be sequentially read one after another. For example, each of the first to k-th PUF cells 110_1 to 110_k may output a cell signal having a unique level based on a logic-high enable signal as shown in the example of FIG. 2A. Thus, as shown in FIG. 8A, enable signals ENAs may be sequentially changed to the logic high due to 'one-hot' encoding. An output signal OUT (having values V1 to Vk that are sequentially generated based on the first to k-th cell signals CS1 to CSk, respectively) may be output based on the enable signals ENAs that are sequentially changed to a logic high.

Similarly, referring to FIG. 8B, first to k-th PUF cells 110_1 to 110_k may be sequentially read one after another. For example, each of the first to k-th PUF cells 110_1 to 110_k may output a cell signal having a unique level based on a logic-low enable signal, as shown in the example of FIG. 2B. Thus, as shown in FIG. 8B, enable signals ENAs may be sequentially changed to a logic low due to 'one-cold' encoding. An output signal OUT having values V1' to Vk' (that are generated based on the first to k-th cell signals CS1 to CSk, respectively) may be output based on the enable signals ENAs that are changed to the logic low.

In some embodiments, the respective enable signals ENAs may be activated in an arbitrary order. For example, FIGS. 8A and 8B illustrate examples in which first to k-th enable signals ENA1 to ENAk are sequentially changed to a logic high or a logic low. In some embodiments, the first to k-th enable signals ENA1 to ENAk may be changed to a logic high or a logic low in an arbitrary predefined order. Also, as described above with reference to operation S40 of FIG. 7, only some of the first to k-th enable signals ENA1 to ENAk may be activated in some embodiments.

Referring to FIG. 8C, at least two of the first to k-th PUF cells 101_1 to 101_k may be simultaneously read. For example, as shown in FIG. 8C, two of the first to k-th cells 110_1 to 110_k may be simultaneously read. For example, an output signal OUT may be generated having a value which is dependent on cell signals output by a pair of PUF cells that have received an activated enable signal. Thus, as shown in FIG. 8C, an output signal OUT having sequential values V1" to V(k-1)" generated to correspond to a plurality of pairs of PUF cells may be generated.

In some embodiments, the pairs of PUF cells that simultaneously receive activated enable signals may be mutually exclusive. For example, FIG. 8C illustrates an example in which the output signal output by the first to k-th PUF cells 110_1 to 110_k have 'k-1' values V1 to V(k-1). However, when a plurality of pairs of PUF cells are mutually exclusive, the output signal OUT may have at most k/2 values. In some embodiments, the plurality of pairs of PUF cells may be selected in an arbitrary order. Furthermore, in some embodiments, a different number of (e.g., at least three) enable signals may be simultaneously activated to simultaneously read a different number of (e.g., at least three) PUF cells.

Figure 9A:
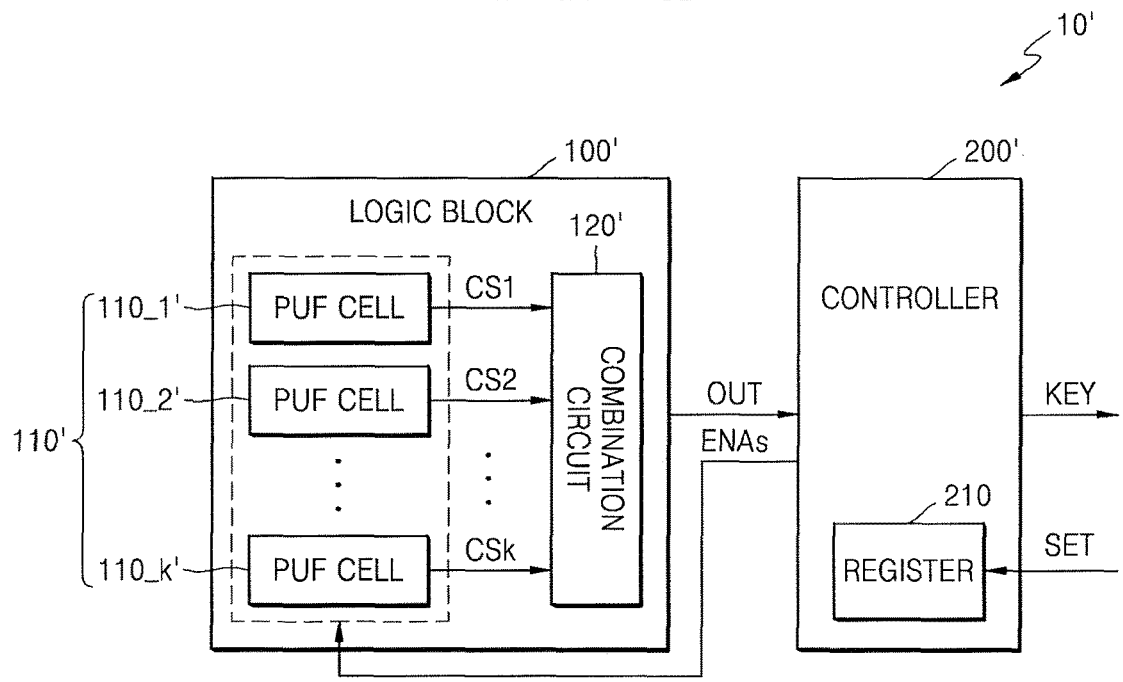
FIGS. 9A and 9B illustrate embodiments of ICs for a PUF.
Figure 9B:
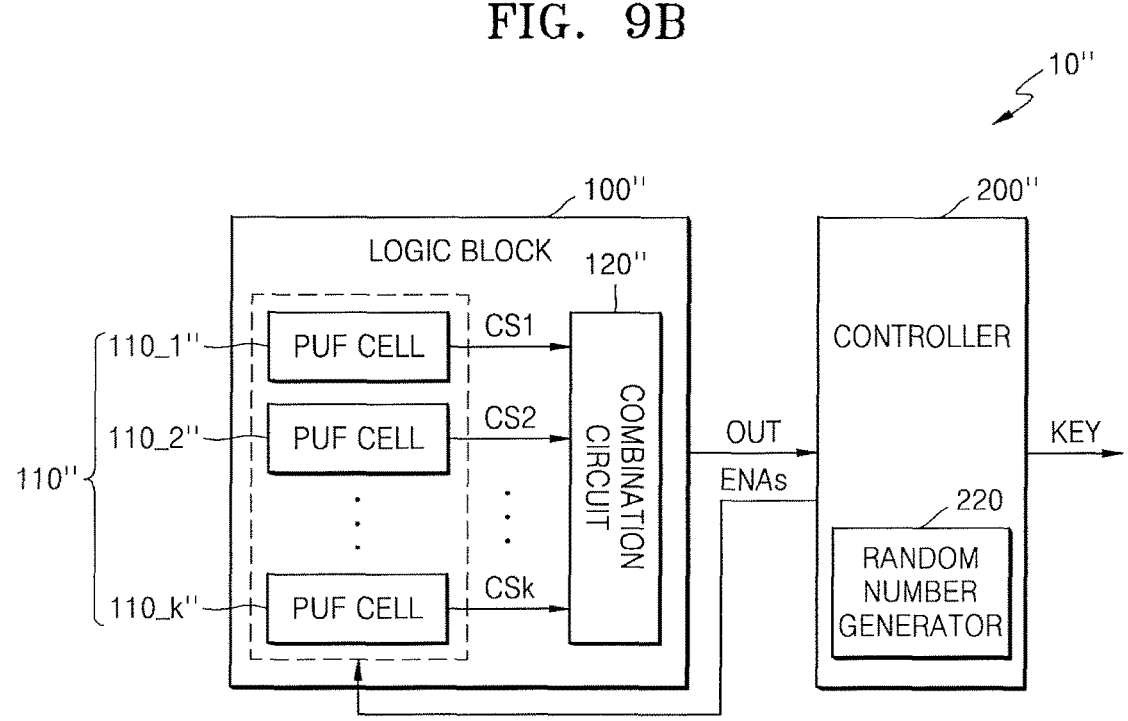

FIGS. 9A and 9B illustrate embodiments of ICs for a PUF. Specifically, FIGS. 9A and 9B respectively illustrate ICs 10' and 10" including controllers 200' and 200" for changing read sequential orders of a plurality of PUF cells 110' and 110". Similar to the IC 10 of FIG. 1, the ICs 10' and 10" of FIGS. 9A and 9B may include logic blocks 100' and 100" and controllers 200' and 200", respectively. The logic block 100' may include a plurality of PUF cells 110' to output a plurality of cell signals CS1 to CSk and a combination circuit 120'. The logic block 100" may include a plurality of PUF cells 110" to output a plurality of cell signals CS1 to CSk and a combination circuit 120".

Referring to FIG. 9A, the controller 200' may include a register 210, and data stored in the register 210 may be changed based on a set signal SET received from the outside of the controller 200'. The controller 200' may output enable signals ENAs based on the data stored in the register 210. When the data is changed based on the set signal SET, an order of generation of an activated enable signal (from among the enable signals ENAs) may be changed based on the changed data. Thus, an order of reading of the first to k-th PUF cells 110_1' to 110_k' may be determined based on the set signal SET. In some embodiments, the set signal SET may change not only the order of reading of the first to k-th PUF cells 110_1' to 110_k' but also the number of PUF cells to be simultaneously read.

The register 210 may include a volatile memory, such as dynamic random access memory (DRAM) and static random access memory (SRAM), or a non-volatile memory, such as flash memory and electrically erasable and programmable read-only memory (EEPROM). Thus, for example, when a key KEY of the IC 10' is exposed, the key KEY may be changed to a unique value different form the previous value.

Referring to FIG. 9B, the controller 200" may include a random number generator 220. The controller 200" may change an order of generation of an activated enable signal (from among the enable signals ENAs) based on a random number generated by the random number generator 220. Thus, entropy of the key KEY may further increase.

In some embodiments, the controller 200" may change not only an order of reading of the first to k-th PUF cells 110_1" to 110_k", but also the number of PUF cells to be simultaneously read, based on the random number generated by the random number generator 220. In some embodiments, the random number generator 220 may generate the random number based on a control signal received from the outside of the IC 10".

Figure 10A:
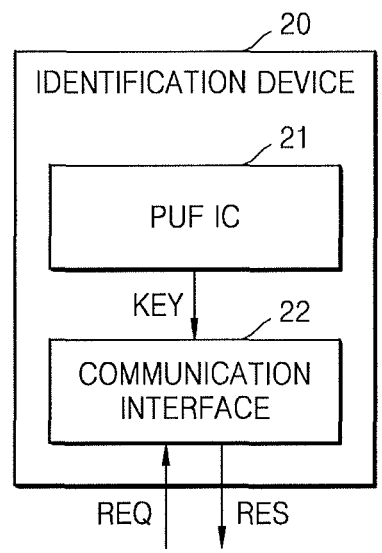
FIGS. 10A to 10C illustrate embodiments of a device including an IC for a PUF.
Figure 10B:
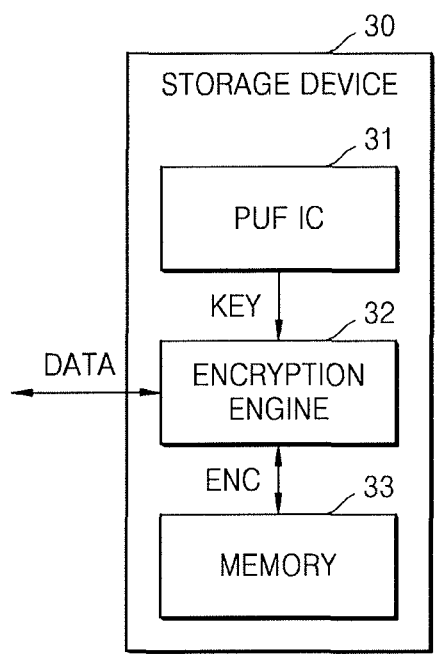
Figure 10C:
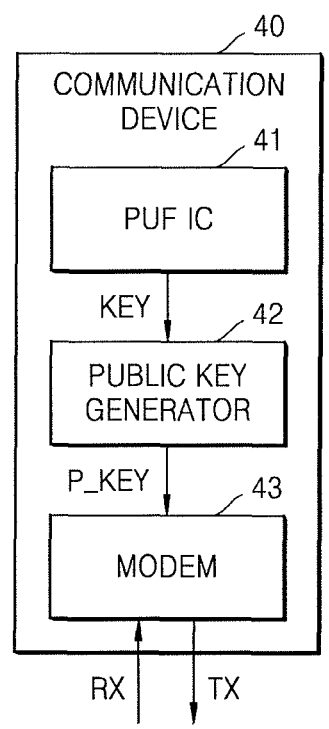

FIGS. 10A to 10C illustrate embodiments of a device including an IC for a PUF according to any of the aforementioned embodiments. An IC serving as a PUF device may include a plurality of PUF cells, each of which outputs a cell signal having a unique level based on a threshold level of a logic gate. A plurality of cell signals may therefore be output by the plurality of PUF cells using a simple structure. As a result, the IC may generate a key KEY having a small area and a low predictability.

Components in each of the identification device 20, storage device 30, and communication device 40 of FIGS. 10A to 10C may be respectively embodied by independent ICs. In one embodiment, at least two of the components in each of the identification device 20, storage device 30, and communication device 40 of FIGS. 10A to 10C may be embodied by one IC.

Referring to FIG. 10A, an identification device 20 may include a PUF IC 21 and a communication interface 22. The identification device 20 may transmit a response RES including identification information of the identification device 20 to an outside device based on an externally received request REQ. For example, the identification device 20 may be a radio-frequency identification (RFID), and the identification information in the response RES may be used to identify a user of the identification device 20. The identification information in the response RES may be generated based on a key KEY generated by the PUF IC 21. The identification device 20 may be downscaled and made lightweight due to a small area, a simple structure, and lower power consumption of the PUF IC 21.

Referring to FIG. 10B, a storage device 30 may include a PUF IC 31, an encryption engine 32, and a memory 33. The storage device 30 may store data DATA received from an outside device or transmit the stored data DATA to an outside device. For the security of the stored data DATA, the storage device 30 may encrypt the data DATA received from the outside device using the key KEY and store the encrypted data ENC in the memory 33. Also, the encryption engine 32 may decrypt the encrypted data ENC read from the memory 33 using the key KEY, and transmit the decrypted data DATA to the outside device. The storage device 30 may be, for example, a portable storage device or a storage device of a storage server. The security for the encrypted data ENC stored in the memory 33 may be enhanced based on a high entropy of the key KEY generated by the PUF IC 31.

Referring to FIG. 10C, a communication device 40 may include a PUF IC 41, a public key generator 42, and a modem 43. The communication device 40 may transmit a signal RX to another communication device or transmit a signal TX to the communication device to communicate with the communication device. The public key generator 42 may generate a public key P_KEY based on a key KEY generated by the PUF IC 41, and the modem 43 may transmit an encrypted signal TX or encrypt the signal RX based on the public key P_KEY. That is, the communication device 40 may perform secure communication with another communication device based on the key KEY. The communication device 40 may be, for example, a portable wireless communication device, may be downscaled and made lightweight due to a small area, a simple structure, and low power consumption of the PUF IC 31, and may perform secure communication with high security based on a high entropy of the key KEY.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, gates, circuits, and other signal generating and signal processing features of the embodiments disclosed herein may be implemented in logic which, for example, may include hardware, software, or both. When implemented at least partially in hardware, the controllers, gates, circuits, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, gates, circuits, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. An integrated circuit for a physically unclonable function (PUF), the integrated circuit comprising:
first and second PUF cells to respectively output first and second cell signals having unique levels based on a threshold level of a logic gate; and
a combination circuit including a first stage to generate a first combination signal based on the first and second cell signals, wherein the first and second PUF cells respectively include first and second logic gates to respectively output the first and second cell signals, wherein the combination circuit includes a third logic gate to receive the first and second cell signals and output the first combination signal, and wherein the third logic gate has a same structure as each of the first and second logic gates, wherein
the first and second PUF cells respectively include a fourth logic gate to generate a signal having a threshold level of the fourth logic gate.

2. The integrated circuit of claim 1, wherein:
the first and second PUF cells are to respectively output the first and second cell signals having a first logic level based on a deactivated first and second enable signals, respectively, and
the third logic gate is to generate the first combination signal independently of an input signal having the first logic level.

3. The integrated circuit of claim 2, wherein the first and second logic gate are to respectively receive the first and second enable signals.

4. The integrated circuit of claim 3, wherein:
the first to third logic gates are NAND gates, and
a level of the deactivated first and second enable signals is a logic low.

5. The integrated circuit of claim 3, wherein:
the first to third logic gates are NOR gates, and
a level of the deactivated first and second enable signals is a logic high.

6. The integrated circuit of claim 3, wherein:
each of the first to third logic gates includes a 2-input logic gate having first and second inputs,
the third logic gate is to receive the first and second cell signals through the first and second inputs, respectively,
each of the first and second logic gates of the first PUF cell is to receive the first enable signal through the second input, and
each of the first and second logic gates of the second PUF cell is to receive the second enable signal through the first input.

7. The integrated circuit of claim 2, wherein the first PUF cell comprises a switch to allow supply of power to the fourth logic gate based on an activated first enable signal and block the supply of power to the fourth logic gate based on the deactivated first enable signal.

8. The integrated circuit of claim 1, wherein:
the combination circuit is to receive a plurality of cell signals including the first and second cell signals,
the first stage of the combination circuit is to generate a plurality of first combination signals independently of a cell signal having a first logic level, from among the plurality of cell signals,
the combination circuit includes a second stage to generate at least one second combination signal independently of a first combination signal having a second logic level, from among the plurality of first combination signals, based on the first combination signals, and the second logic level is different from the first logic level.

9. The integrated circuit of claim 8, wherein:
when the first logic level is logic high, the first stage of the combination circuit includes a plurality of NAND gates serving as the third logic gate and the second stage of the combination circuit includes at least one NOR gate, and
when the second logic level is logic low, the first stage of the combination circuit includes a plurality of NOR gates serving as the third logic gate and the second stage of the combination circuit includes at least one NAND gate.

10. An integrated circuit having a physically unclonable function (PUF), the integrated circuit comprising:
a plurality of PUF cells, each of which is to generate a cell signal having a unique level; and
a combination circuit to receive a plurality of cell signals from the plurality of PUF cells and generate an output signal corresponding to at least one of the plurality of cell signals, wherein each of the plurality of PUF cells includes a plurality of logic gates and wherein the unique level of the cell signal is determined based on threshold levels of the plurality of logic gates, wherein the plurality of logic gates includes:
a first logic gate to output a first signal having a first threshold level of the first logic gate; and
a second logic gate to amplify the first signal based on a second threshold level of the second logic gate and output a second signal.

11. The integrated circuit of claim 10, wherein:
each of the plurality of logic gates is to invert an input signal and output an output signal,
an output of the first logic gate is connected to an input of the first logic gate, and
the second logic gate is to invert the first signal and output the second signal.

12. The integrated circuit of claim 10, wherein each of the first and second logic gates includes an inverter, a NAND gate, or a NOR gate.

13. The integrated circuit of claim 10, wherein:
the first logic gate includes an inverter, and
the second logic gate includes an isolation (ISO) logic gate.

14. The integrated circuit of claim 10, wherein:
each of the plurality of PUF cells is to receive one of a plurality of enable signals and generate the cell signal having a first logic level based on a deactivated enable signal, and
the combination circuit is to output the output signal independently of a cell signal generated by a PUF cell that received the deactivated enable signal, from among the plurality of PUF cells, based on the first logic level.

15. The integrated circuit of claim 14, wherein the combination circuit includes:
a first stage to generate a plurality of first combination signals independently of the cell signal having the first logic level from among the plurality of cell signals; and
a second stage to generate at least one second combination signal independently of a first combination signal having a second logic level from among the first combination signals, wherein the second logic level is different from the first logic level.

16. An integrated circuit for a physically unclonable function (PUF), the integrated circuit comprising:
- a logic block including a plurality of PUF cells to respectively generate cell signals having unique levels determined based on threshold levels of a plurality of logic gates, the logic block to output an output signal corresponding to at least one of a plurality of cell signals based on a plurality of enable signals; and
- a controller to generate the plurality of enable signals including an activated enable signal to select at least one of the plurality of PUF cells and to generate a key of the integrated circuit based on the output signal, wherein
- the controller is to simultaneously generate the plurality of enable signals including only one activated enable signal.

17. The integrated circuit of claim 16, wherein the controller is to activate the plurality of enable signals in a predefined sequential order or based on a random number generated by a random number generator.

18. The integrated circuit of claim 16, wherein the logic block includes:
- a plurality of PUF cell groups to receive the plurality of enable signals in common, the logic block to output a plurality of output signals respectively corresponding to the plurality of PUF cell groups, and
- the controller is to generate the key of the integrated circuit based on the plurality of output signals.

* * * * *